No. 832,496. PATENTED OCT. 2, 1906.
M. S. MOREMEN.
SAP RECEPTACLE.
APPLICATION FILED SEPT. 25, 1905.
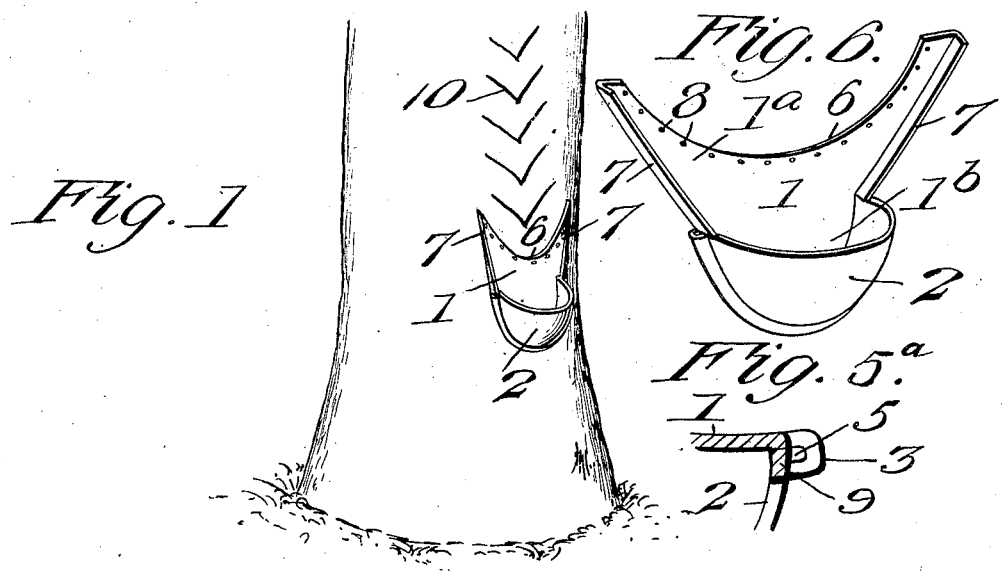
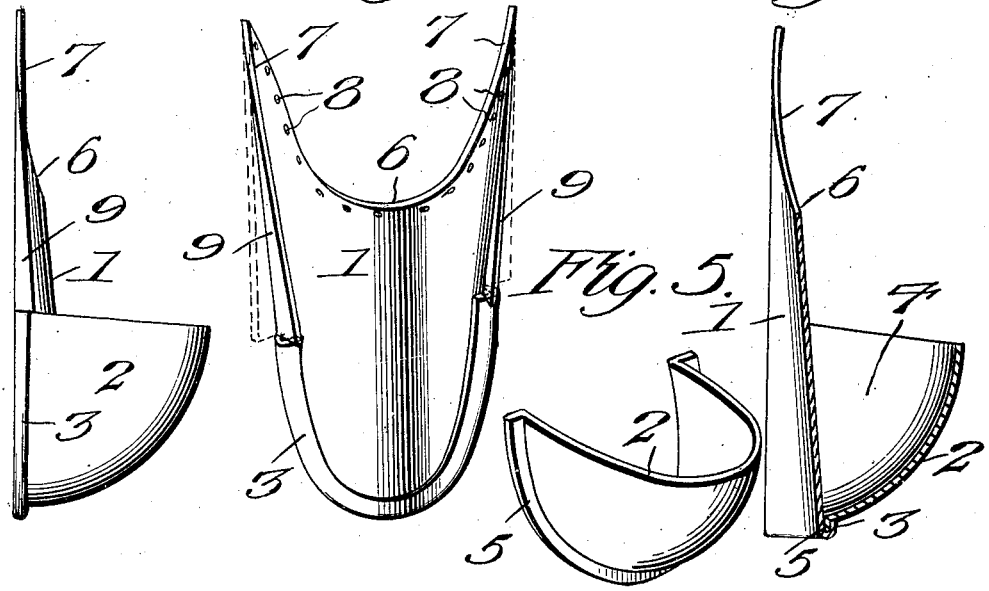
Inventor
Marcus S. Moremen,
By Victor J. Evans
Attorney
Witnesses
THE NORRIS PETERS CO., WASHINGTON, D. C.

UNITED STATES PATENT OFFICE.

MARCUS S. MOREMEN, OF SWITZERLAND, FLORIDA.

SAP-RECEPTACLE.

No. 832,496.      Specification of Letters Patent.      Patented Oct. 2, 1906.

Application filed September 25, 1905. Serial No. 279,990.

*To all whom it may concern:*

Be it known that I, MARCUS S. MOREMEN, a citizen of the United States of America, residing at Switzerland, in the county of St. John and State of Florida, have invented new and useful Improvements in Sap-Receptacles, of which the following is a specification.

This invention relates to a sap-receptacle adapted to be applied to the trunks of pine and other trees to catch the sap running therefrom.

The object of the invention is to provide a sap-receptacle which is simple of construction, efficient in use, and inexpensive of production, which is adapted to closely conform to the trunk of a tree and effectually gather the issuing sap and prevent waste thereof, which obviates the necessity of making cuts or incisions so deep as to weaken the tree or impair its vitality, and which embodies novel means for holding the parts thereof assembled and guiding the sap to the receiving-bowl.

The preferred embodiment of the invention is illustrated in the accompanying drawings, in which—

Figure 1 is a perspective view showing the application of the invention to a tree for collecting the sap issuing therefrom. Fig. 2 is a side elevation of the receptacle or collector detached. Fig. 3 is a central vertical section of the same. Fig. 4 is a perspective view of the back or body of the collector. Fig. 5 is a similar view of the bowl thereof. Fig. 5$^a$ is a detail section on line 5$^a$ 5$^a$ of Fig. 4. Fig. 6 is a perspective view showing a modification in the construction of the collector.

The collector or receptacle comprises a back or body 1 and a bowl or receiving-chamber 2, which are preferably made of sheet metal, but may be composed of any other suitable material. The back 1 consists of an oblong plate of concavo-convex form to snugly fit against the trunk of a tree and has a rounded or arcuately-curved lower edge inturned to form a confining-flange 3. The receiving chamber or member 2 is preferably made semi-bowl shaped and has its inner open side fitting against the lower portion of the back 1 and closed thereby to form a chamber 4 to receive and hold the sap. The side and lower edges of the body are curved to conform to the shape of the lower portion of the back and are formed with an outturned flange 5, fitted between the back and flange 3 of the latter to form a fastening connection. The flanges may be crimped to hold them in firm engagement, and solder is preferably employed to form a close joint between the same, so as to prevent possible leakage and loss of juice from the chamber 4.

The back 1 is cut away at its upper end to form a substantially U-shaped gathering-recess 6 and to produce upper side wings 7, forming the sides of the recess and having their inner side edges converging toward the base of the latter to conduct the gathered juice to the central portion of the back, so that it will flow down into the center of the receptacle. These wings are formed with openings 8 for the passage of suitable fastening devices to secure the back 1 to a tree. This location of the fastening devices serves to hold the inclined edges of the gathering-recess in close contact with the tree to prevent the creation of any crevices through which the sap may escape. The back 1 is further provided above the flange 3 with side flanges or wings 9, which are of approximately triangular form and gradually increase in extent of projection toward the lower ends thereof. These flanges normally lie in the plane of the back, as indicated in dotted lines in Fig. 4, to permit of the application of the bowl 2 in the process of forming the collector, after which application of the bowl the flanges are bent inwardly and forwardly at right angles to the plate to overlie the flanges 3 and 5 and abut against the upper edge of the bowl or lie in close contiguity thereto to stiffen the back and reinforce the fastening connection between the back and bowl and prevent any possible dislocation of the latter. These flanges operate as guides and fenders to prevent the juice flowing from the gathering-recess over the front surface of the back from passing outwardly and off the side edges of the back and becoming wasted.

By reference to Figs. 4 and 6 it will be seen that the lower ends of the flanges 9 bear against the upper ends of the flange 5 of the bowl 2. Owing to this arrangement permanent connection of the flanges 3 and 5 is not absolutely essential, as after the bowl has been slipped into position and the flanges 9 bent inward the latter will hold the bowl in applied position, it being only necessary in such instance to adapt the flanges 3 and 5 to fit sufficiently close or to use in connection therewith some suitable packing to prevent leakage of the collected sap at the joint, thus enabling the parts of the collector to be applied and removed at will for use and package in close compass for storage and transportation. Although it is deemed preferable to crimp or otherwise interlock the flanges 3 and 5 or to solder them together, it will be apparent that in any event the flanges 9, in addition to preventing the loss of flowing sap and stiffening the back 1, will reinforce the connection between the back and bowl and prevent any possibility of the latter becoming loosened in case it should be accidentally struck against an interfering object while being handled or transported.

In practice the device is applied to a tree in the manner shown in Fig. 1, the back 1 being arranged to bear against the trunk with the bowl 2 disposed outermost and the gathering edge 6 arranged below the cuts or incisions 10 in the tree-trunk. The peculiar form of the gathering-recess permits of the cuts or incisions 10 being made of V or U form and limited in depth, so that a series of them may be employed without injury to the tree. Sap flowing from the incisions will be gathered by the edge of the recess 6 and flow downward over the front surface of the back 1 into the chamber 4, where it will be retained for ready removal. By making the back 1 of concavo-convex form to conform to the shape of the trunk of a tree the device will fit closely against the tree, and no joint-spaces or crevices will be left between the back and trunk of the tree for the escape of the descending sap, further liability of the escape of the sap after being gathered being prevented by the flanges 9.

The construction of the receptacle may be modified in the manner shown in Fig. 6, in which the upper portion 1ª of the back 1 is of substantially truncate triangular form and has imparted thereto an approximately elliptical shape through the formation of the recess 6, thus increasing the extent of the collecting-surface, while the lower portion 1ᵇ of the back is of relatively smaller size. The flanges here are inclined, of course, to a greater extent to accord with the increased width of the collecting-surface and to guide the sap from any portion thereof to the bowl. The advantages of this form of the device will be readily appreciated.

Having thus described the invention, what is claimed as new is—

A sap-collector comprising an elongated concavo-convex back plate having a lower half of semicircular or semi-elliptical form and an upper half having a gradual upward and outward flare, said upper half being formed with a comparatively deep gathering-recess extending approximately half the length thereof and providing narrow elongated wings, the extremities of the wings being provided with openings for the passage of fastenings to secure the collector to a tree and hold the upper side edges of the wings in close contact therewith, the said lower half of the back plate being formed with an inturned flange, a bowl having an outturned flange engaging said inturned flange and adapted to be inserted by a downward sliding movement from above, and guard-flanges upon the flaring side edges of the plate bent at right angles thereto to overlie the connecting-flanges of the plate and bowl, said guard-flanges being of triangular form to gradually increase in extent of outward projection toward the bowl and to form stops lying in the path of the flange of the bowl to prevent any possible upward movement thereof, substantially as described.

In testimony whereof I affix my signature in presence of two witnesses.

MARCUS S. MOREMEN.

Witnesses:
JULIAN H. DART,
W. J. KIRKBY.